324-77.

SR 8-28-73 XR 3,755,755

United States Patent [19]
[11] 3,755,755

Victoreen
[45] Aug. 28, 1973

[54] AUDIO OSCILLATOR FOR GENERATING EITHER C.W., DAMPED WAVE TRAINS, OR NARROW BAND NOISE

[76] Inventor: John A. Victoreen, 350 S. Maitland Ave., Maitland, Fla. 32751

[22] Filed: Mar. 22, 1972

[21] Appl. No.: 234,608

[52] U.S. Cl....................... 331/78, 307/261, 324/77, 331/109, 331/110, 331/141, 331/173, 332/50

[51] Int. Cl......................... H03b 5/26, H03b 29/00

[58] Field of Search...................... 331/78, 109, 110, 331/141, 183, 172–174; 332/50; 324/77, 78; 307/261

[56] References Cited

UNITED STATES PATENTS 3,229,227 1/1966 Popodi........................... 331/173 X 3,327,044 6/1967 Markowitz........................ 331/78 X 3,363,198 1/1968 Davies............................ 331/174 X

*Primary Examiner*—Roy Lake

*Assistant Examiner*—Siegfried H. Grimm

*Attorney*—J. D. Douglass

[57] ABSTRACT

A ringing circuit of the RC type is provided which is adjusted to the point where it is just short of self excitation. An input signal is applied to the ringing circuit to cause it to oscillate at an amplitude which follows the input signal. Then the output signal from the circuit has the applied signal cancelled to leave only the signal of the ringing circuit.

2 Claims, 1 Drawing Figure

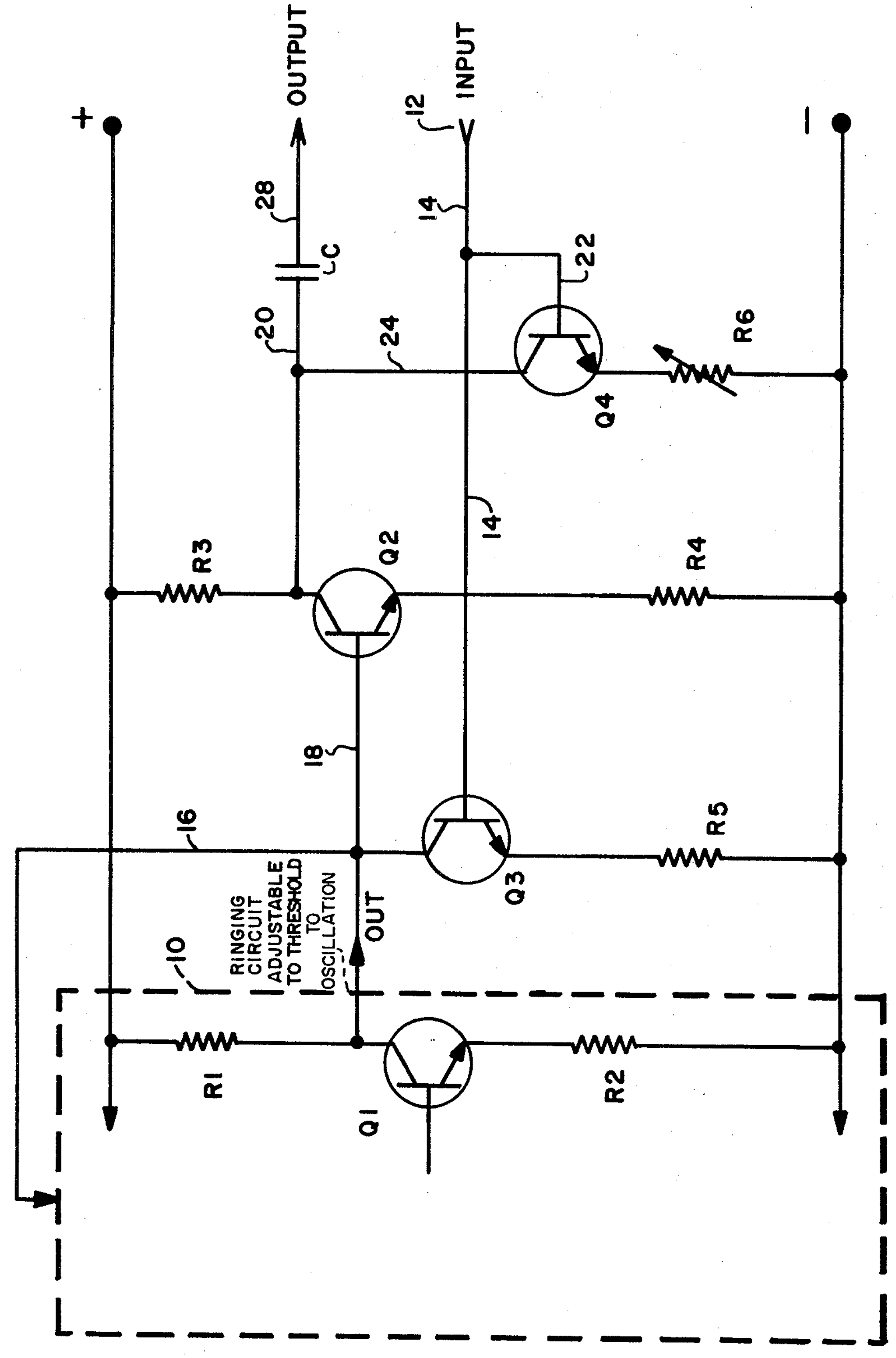
+
−
OUTPUT
INPUT
12
14
28
C
20
22
24
R6
Q4
R3
Q2
R4
18
16
R5
Q3
OUT
RINGING
CIRCUIT
ADJUSTABLE
TO THRESHOLD
TO
OSCILLATION
10
R1
Q1
R2

AUDIO OSCILLATOR FOR GENERATING EITHER C.W., DAMPED WAVE TRAINS, OR NARROW BAND NOISE

This application is an improvement over that shown in my copending application of the same title, Ser. No. 15,093 filed Feb. 27, 1970 now U.S. Pat. No. 3,652,953.

BACKGROUND OF THE INVENTION

As fully explained in my copending application it is desirable to test hearing by generating damped wave trains and narrow band noise signals to reduce as much as possible the subjective determination of the character of the signal. In that application there was shown a ringing circuit which could be adjusted to provide C. W. signals, damped wave signals and narrow band noise signals. In the generation of damped wave and narrow band noise signals an RC ringing circuit was provided which could be adjusted to a point short of self-excitation and then excited by the injection of a saw-tooth wave and the resultant signal out of the oscillator was one that included the injected signal and the ringing signal, the amplitude of which followed the injected signal. In order to obtain the desired signal, to be used for testing hearing, it was necessary to cancel the injected signal from the composite output signal and leave only the ringing signal. This was done largely by a voltage divider network in the output wherein the amplified injected signal and the injected signal cancelled each other. Some difficulties were encountered in the adjustment of such a circuit as well as the construction because of the critical values of the resistors.

SUMMARY OF THE INVENTION

The present invention utilizes transistors as the critical elements in the output circuit whereby the injected signal is used to balance out the amplified injected signal from the composite signal which consists of the injected signal and the ringing signal. In the configuration disclosed, the ringing circuit is adjusted to the point where it is ready to ring, just short of the point of self excitation. The input or exciting signal is amplified and applied to the ringing circuit. The input signal is also amplified and is phase reversed. This signal is combined with the output signal from the ringing circuit to cancel out the exciting signal.

In the drawing is shown a simplified schematic diagram of the circuit of the invention.

DESCRIPTION OF THE PREFERRED EMBODIMENT

In the drawing, the dotted block 10 represents a ringing circuit which may be of the type shown in said copending application. The transistor $Q_1$ corresponds to the transistor $Q_2$ in the copending application, and the elements in the block 10 (not shown) are shown in the co-pending application as being the elements to the left of the transistor $Q_2$ in that application, with the resistors $R_1$ and $R_2$ of this application corresponding to the resistors $R_5$, $R_6$ and $R_7$ in the co-pending application. In this application, line 16 is the feed back line and corresponds to the line from "D," emitter of $Q_3$ in the prior circuit which feeds back to $C_2$. In this instance there is shown the output transistor $Q_1$ which may be an emitter follower, but is shown as a common emitter with it's collector resistance $R_1$ connected to a positive source of voltage. This ringing circuit may be adjusted the same as described in the copending application to the point where it is ready to ring, i.e., just short of self-oscillation.

A signal, which is to be the exciting signal and may be of saw-tooth wave form, is applied to the input 12 and thence by line 14 to the base of a transister $Q_3$, where it may be amplified and then applied to the collector end of the load resistor $R_1$. The emitter of $Q_3$ is connected to ground or negative through a resister $R_5$. The circuit, $R_1$, $Q_3$ and $R_5$, may be an amplifier if $R_1$ and $R_5$ are not equal. The voltage across $R_1$ appears between the collector of $Q_3$ and ground or negative. It is then fed back by line 16 to the ringing circuit thus causing it to ring in conformity with the exciting signal.

The output from the ringing circuit via transistor $Q_1$ is applied through line 18 to the base of transistor $Q_2$. The injected signal (saw-tooth) from $Q_3$ also appears at the base of $Q_2$, without phase reversal, and comes out of $Q_2$ via line 20. The input signal at 12 is also applied to the base of a transistor $Q_4$ via line 22 and passes into line 24 and thence to load resistor $R_3$ which is common to $Q_2$ and $Q_4$. The collector of $Q_4$ connects to negative through the variable resistor $R_6$. Since the saw-tooth signal from $Q_4$ is also connected via line 24 to line 20, this signal is also conducted to line 20 but is of opposite phase to the saw-tooth component of the signal appearing on line 20.

By adjusting $R_6$ in the collector of $Q_4$, the amplitude of the signal from $Q_4$ can be controlled, and, being of opposite phase, can cancel out the saw-tooth component of the composite signal on line 20. Then it is applied through the condenser C, to eliminate the D.C. component, in the output line 28 and leaves a wave form in the output which may be a damped wave train.

It will thus be seen that the same results are obtained by this circuit as in that of the copending application with the added advantage that highly critical adjustments of resistors have been eliminated and a more stable circuit is realized.

It is pointed out that although the gain of the phase inverted injected signal is shown as being controlled by the adjustment of the variable resistance $R_6$ in the emitter circuit of $Q_4$ that it would be possible to control the gain by adjusting $R_5$, $R_1$ or $R_3$ and desirable results obtained.

I claim:

1. A circuit for generating signals comprising a ringing circuit having a transistor in the output with a load resistor connected to the collector and having a common input and output terminal, means for injecting a signal into the input comprising a signal source and a second transistor having its base connected to the signal source and its collector connected to the collector end of said load resistor with the load resistance of said first and second transistors being common to each other, said signal source being connected to the base of a third transistor which inverts the signal phase, the collector and load resistor of said third transistor providing an output, a fourth transistor having its base connected to the injecting signal source through said second transistor and its collector connected to the collector of the third transistor whereby the load resistance for the third transistor is common to the fourth transistor, means to adjust the gain of one of the transistors to provide cancellation of the input signal from the output signal of the fourth transistor.

2. A circuit as described in claim 1 wherein said third transistor is connected as an amplifier.

* * * * *